United States Patent [19]

Rahn et al.

[11] 4,108,634
[45] Aug. 22, 1978

[54] PROCESS FOR THERMALLY TREATING FINE-GRAINED SOLIDS

[75] Inventors: Martin Rahn; Lothar Reh, both of Frankfurt am Main; Bernd Thöne, Friedberg; Karel Vydra, Bad Nauheim, all of Germany

[73] Assignees: Metallgesellschaft Aktiengesellschaft, Frankfurt am Main; Deutsche Babcock Aktiengesellschaft, Oberhausen, both of Germany

[21] Appl. No.: 823,858

[22] Filed: Aug. 11, 1977

[30] Foreign Application Priority Data

Apr. 12, 1977 [DE] Fed. Rep. of Germany ....... 2716083

[51] Int. Cl.$^2$ ............................................. C21B 15/00
[52] U.S. Cl. ............................................. 75/23; 75/9; 75/25; 48/204; 423/44; 423/88; 423/97; 423/107; 423/315; 423/569; 423/604; 423/617; 423/619; 423/623
[58] Field of Search .................... 75/23, 25, 9; 48/204; 423/44, 97, 107, 315, 569, 604, 617, 619, 623

[56] References Cited

U.S. PATENT DOCUMENTS 3,915,692   10/1975   Herbert et al. ........................... 75/23

*Primary Examiner*—M. J. Andrews
*Attorney, Agent, or Firm*—Karl F. Ross

[57] ABSTRACT

A process for thermally treating fine-grained solids with high-oxygen gases at temperatures at which the solids can form molten and gaseous reaction products comprises carrying out the thermal treatment at least in part in a cyclone chamber. The solids, high-oxygen gases and, if desired, an energy carrier (usually a carbon-containing solid, liquid or gas) are mixed to form a suspension at a temperature below the reaction temperature. The suspension is fed to a vertical combustion path (tube) and reacts therein to form another suspension of primarily molten particles which is admitted to the cyclone chamber. Reactants are added to the gas phase within a core-flow region of the cyclone chamber and/or immediately after the discharge of gas therefrom to a cooling chamber.

17 Claims, 2 Drawing Figures

PROCESS FOR THERMALLY TREATING FINE-GRAINED SOLIDS

FIELD OF THE INVENTION

The present invention relates to a process for thermally treating fine-grained solids with high-oxygen gases at temperatures at which the solids can form molten and gaseous products. The invention also relates to an apparatus for carrying out this thermal treatment, to a method of operating such an apparatus and to improvements in pyrometallurgical processes, e.g. the roasting of sulfide ores, ore concentrations or other metallurgical intermediates.

BACKGROUND OF THE INVENTION

In various pyrometallurgical processes, attention has centered of later upon the use of a cyclone chamber into which the fine-grained solids, high-oxygen gases and, if desired, an energy carrier such as a fuel are introduced to undergo reaction.

Cyclones of this type have found application in combustion installations, e.g. furnaces, as well as in pyrometallurgy: Various systems using such cyclones are described in the following publications: *Lexikon der Technik*, vol. 7, *Lexikon der Energietechnik und Kraftmaschinen*, L - Z, Deutsche Verlagsanstalt Stuttgart, 1965; I. A. Onajew, *Zyklonschmelzen von Kupfer und polymetallischen Konzentraten,* Neue Hutte 10, 1965, pp. 210 et seq.; Printed German Applications (Auslegeschrift) 11 61 033, 19 07 204, and 20 10 872; Opened German Specification (Offenlegungsschrift) 21 09 350; Sch. Tschokin, *Freiburger Forschungshefte, B*150, Leipzig, 1969, pp. 41 et seq.; G. Melcher et al and E. Muller in Erzmetall, vol. 28, 1975, pp. 313 *et seq., vol.* 29, 1976, pp. 322 et seq., vol. 30, 1977, pp. 54 et seq The reason why cyclone chambers have been found to be especially effective in pyrometallurgical treatments, and, more generally for carrying out reactions in which an oxygen-containing gas participates, is that the throughput of the cyclone per unit of reactor volume is high compared to other solid/gas treatment systems. High reaction temperatures can be obtained, thereby permitting volatilization of various components of the solid feed.

There is described in Printed German Application (Auslegeschrift) No. 22,53,074 and corresponding to U.S. Pat. No. 3,915,692, a technique which utilizes a cyclone chamber and which ensures that the reactants are intensely mixed and are caused to react to a considerable extent in a vertical combustion path before entering the cyclone chamber. This system provides a vertical combustion path at the inlet of the cyclone chamber.

The advantage of this system, over the operation of a cyclone chamber without a combustion path ahead of the chamber is that it precludes a separation of particles of the feed solid in the cyclone chamber and the entrapment of the separated solids in the molten film which lines the walls of the cyclone chamber and which might prevent these particles from participating in the reaction.

While the aforedescribed system permits cyclone reactors to be used most effectively for the reaction of metallurgical particulates with high-oxygen gases, it is of interest in many cases to carry out further reaction in the gas phase. For example, the gas phase obtained in a given process may contain, just as does a molten phase, a substance which is only an intermediate and which desirably should undergo a further reaction with a substance not normally present in either the gas phase or the molten phase. As a result, it is necessary to recover the gas phase and carry out a reaction between the intermediate or unreacted substance therein and a further reaction. In many instances, the unreacted substance of the gas phase must be separated from other components of the gas phase so as to carry the further reaction in an efficacious manner. Naturally this leads to additional capital expenditures for separating apparatus and further reactants and presents complications with respect to separation and subsequent reaction. From a point of view of energy economy, moreover, systems of this type are disadvantageous because the gas phase may have been reheated to permit the subsequent reactions to be carried out. All in all, therefore, prior cyclone reaction processes, including that of the most advanced systems described in U.S. Pat. No. 3,915,692, may not be fully satisfactory for all purposes.

OBJECTS OF THE INVENTION

It is the principal object of the present invention to provide a process for the treatment of solids, especially with high-oxygen gases, using a cyclone chamber whereby the aforedescribed disadvantages are obviated and which further improves upon the system described in U.S. Pat. No. 3,915,692.

It is another object of the present invention to provide a process for the purposes described which is relatively simple and does not require expensive apparatus.

Yet another object of the invention is to provide an improved installation for the thermal treatment of solids whereby disadvantages of earlier systems can be obviated and the apparatus is of relatively low cost and high effectivity.

Still another object of the invention is to provide an improved method of operating a plant or apparatus for the treatment of solids, especially in the carrying out of pyrometallurgical processes.

It is yet another object of the invention to provide a pyrometallurgical treatment for solids, especially for the roasting of sulfide ores, ore concentrates and other metallurgical intermediate products, which precludes caking of the cooling means, is of particularly high efficiency and can be carried out in a simple manner in relatively inexpensive apparatus.

Still another object of this invention is to provide a method which makes use of the advantages of the cyclone reaction process as advanced by U.S. Pat. No. 3,915,692 but in addition renders the same more versatile and more efficient for various reaction requirements than has hitherto been the case.

Yet another object of this invention is to provide an improved apparatus of greater versatility and efficiency at low capital cost than has hitherto been available for carrying out cyclone-reaction purposes.

SUMMARY OF THE INVENTION

According to the present invention, the process of thermally treating fine-grained solids with a high-oxygen gas, especially a metallurgical process such as the roasting of an ore, ore concentrate, or another metallurgical intermediate to form a molten product, and, if desired, to volatilize a metal, is carried out by introducing a charge consisting of fine-grained solid, the high-oxygen gas, and, if desired, an energy carried, i.e. carbonaceous combustible fuel in a suspension into a vertical combustion path or tube and reacting this suspension to form a further suspension which is predominantly of molten particles in its nongaseous phase, this further suspension being introduced into the cyclone chamber and further reacted therein to form a melt and a gas which swirls about the axis of the cyclone chambers to provide a so-called core-flow region therein. According to an important feature of the invention, a further reactant, which will be described in greater detail below, is reacted with the gas within the cyclone chamber in the core-flow region and/or immediately after the gas is discharged from the cyclone chamber through an outlet lying along this axis and preferably leading to a cooler.

The further reactant can thus be introduced within the core-flow region of the cyclone reactor, into the discharge path connecting the cyclone chamber with the cooler or into the cooler at the point at which the gas from the cyclone chamber enters the latter.

For the purposes of the present invention, the core-flow region, the outlet duct connecting the cyclone chamber and the cooler and inlet region of the cooler are defined as the "gas-flow path". The molten phase is discharged from the cyclone chamber through an opening provided in the lower portion of the shell of the cyclone.

More specifically, the objects of the invention are attained by feeding the subsequently formed suspension into a cyclone chamber to form a gas-flow path including a core-flow region within the cyclone chamber, a gas transfer region between the axial outlet from the cyclone chamber and a cooler, and a further gas flow region at the inlet of this cooler, the molten material produced from the suspension being separated in the cyclone chamber and discharged through an opening provided in the lower portion of the shell of the cyclone chamber. According to an essential feature of the invention, reactants are added to the gas phase along this gas-flow path to initiate a subsequent reaction within the core-flow region of the cyclone chamber and/or immediately after the discharge of the gas from the cyclone chamber.

The point at which the reactant for the subsequent reaction is added will depend upon the heat of reaction involved in this subsequent reaction. Because molten droplets are inevitably discharged at low rates with the exhaust gas from the cyclone chamber and a solidification of the molten material can occur as a result of cooling, giving rise to connecting of the solidified material in the transfer passage between the outlet opening of the cyclone chamber and the cooling chamber, highly endothermic reactions must not be initiated to a substantial extent before the gas reaches the cooling chamber. This permits the molten particles to solidify only within the cooling chamber in free flight and without contact with cool walls or other surfaces so that obstruction of the free-flow passage of condensable and solidifiable materials therein will not occur.

In other words, if the temperature and heating capacity of the gas are sufficiently high within the core-flow region of the cyclone chamber and the discharge passage, a somewhat endothermic reaction can be initiated ahead of the inlet to the cooling chamber as long as the temperature reduction in the gas prior to entering the latter does not cause deposition and caking of material.

If, on the other hand, a highly endothermic reaction is contemplated which will reduce the temperature of the gas below that at which condensation and solidification can occur within the gas in free flight, it is desirable to initiate this reaction only upon entry of the gas stream into the cooling chamber. In the latter case, i.e. when the subsequent reactant is added upon entry of the gas stream into the cooling chamber, the reaction promotes the cooling process without disadvantage because solidification occurs with molten particles in free flight as noted earlier.

The determination of the character of the subsequent reaction which is permissible within the concept of the present invention will depend not only upon the generation or consumption of heat involved in the chemical reaction of the reactant in the gas phase (reactants) and the subsequently added reactant (or reactants) but also changes of state (latent heats) of the several reactants, the entraining fluid and the reaction products must be taken into consideration. For this reason, the sum effect of all heat-consuming and heat-generating reactions, changes of state and other phenomena which occur prior to, during or subsequent to the further reaction or are related thereto must be taken into consideration.

Exothermic subsequent reactions are best effected in the core-flow region of the cyclone chamber, in the transfer passage between the cyclone chamber and the cooling chamber and the cooling chamber or in the cooling chamber.

The term "core-flow region" is used here to describe the flow region which is approximately symmetrical to the substantially horizontal axis of the cyclone chamber and extends generally throughout the length thereof with approximately the same cross-sectional area as the outlet opening of the cyclone chamber. The flow in the core-flow region exhibits a substantially slight swirl and runs parallel to the cyclone axis toward the outlet opening.

Subsequent reactions which are slightly endothermic or are neither endothermic nor exothermic and thus involve neither a consumption nor a generation of heat may be initiated in the core-flow region of the cyclone chamber or in the transfer passage if the cyclone chamber is to be operated at very high temperatures.

When the subsequent reaction is predominantly endothermic, as noted, it should not be initiated ahead of the cooling chamber. In this case the reactant may constitute the cooling medium or be supplied in addition to the cooling medium, the reactant being admixed with the gas leaving the transfer passage at a high velocity so that the momentum of the gas leaving the transfer passage and cyclone chamber and the added reactant are utilized for thorough mixing.

As will be apparent below, mixing of the components is particularly advantageous when the gas jet leaving the transfer passage enters the cooling chamber at a velocity between 30 and 300 m/sec, preferably between 50 and 120 m/sec.

We can provide, downstream of the cyclone chamber, which can otherwise be of the type described in U.S. Pat. No. 3,915,692, a cooling chamber which communicates with the cyclone chamber through an opening in an end wall of the cyclone chamber aligned with the axis thereof, the cooling chamber being dimensioned and operated such that the molten droplets contained in the gas stream entering the cooling chamber are cooled below their solidification point (melting point) while they are in free flight (entrained by the gas stream), thereby ensuring that the solidifiable materials will have been at least superficially solidified before they contact any solid surfaces within the cooling chamber, e.g. the walls thereof.

The cooling chamber can be of the type more fully described in commonly assigned copending application Ser. No. 823,856.

The cooling chamber is connected to the cyclone chamber by a transfer passage which has a length of 0.5D to 5D, preferably 1 to 2D, where D is the diameter of the outlet opening in the end wall of the cyclone chamber. The diameter of the outlet opening should be equal to that of the transfer passage and not less than 0.3m. The cooling chamber preferably has a horizontal axis or a substantially horizontal axis.

When reference is made herein to a substantially horizontal axis, it will be understood that this is intended to refer to an axis which is horizontal or inclined upwardly from the horizontal by an angle up to about 15°.

According to a particularly preferred feature of the invention, the reactant, whether supplied in the cyclone reactor, the transfer duct or the cooling chamber, is fed through a plurality of openings having outlet directions disposed in the conical surface of an imaginary cone, which has an included angle of 30° to 160°. The axis of said cone in the cooling chamber is identical to the extended axis of the transfer passage, and the apex of the cone faces in the direction of flow.

The cooling chamber which succeeds the cyclone chamber preferably consists of a chamber which is wider than the transfer passage.

The cooling chamber should be symmetrical with respect to a vertical plane which includes the axis of the cyclone chamber and may be of a square, rectangular, circular, elliptical or polygonal vertical cross section. When the cooling chamber has a horizontal axis or a substantially horizontal axis, we have found that the chamber should have a cross-sectional area that is at least 5.5 times and preferably 10 to 30 times the cross-sectional area of the aforementioned outlet opening in the end wall of the cyclone chamber, i.e. at least $5.5 \times R^2$, where $R = D/2$.

The use of cooling chambers having the stated dimensions ensures that initially molten particles will have completely solidified at least on their surface before contacting the walls of the cooling chamber so that these particles cannot adhere to the wall of the cooling chamber and the particles will fall to the bottom of the cooling chamber and can be removed therefrom in a simple manner by means of a conveyor, e.g. a cooled screw conveyor.

To facilitate removal of the solidified product in a process in which a horizontal cooling chamber is used, the cooling chamber has a cross-sectional configuration which consists of a rectangle on its upper side and a downwardly converging trapezoid in its lower side, the trapezoid having its small base at the bottom of the cooling chamber. In this case, the trapezoidal portion of the cooling chamber constitutes a funnel which directs the solids downwardly.

The length L of the cooling chamber should be between $3\sqrt{F}$ and $10\sqrt{F}$ where F is the cross-sectional area of the cooling chamber.

The gas can be cooled in the cooling chamber by water-cooled or vapor-cooled (steam-cooled) chamber walls or by the addition of gaseous aqueous fluids to the gas stream admitted by the transfer passage from the cyclone chamber into the cooling chamber.

For highly endothermic reactions, it is sufficient to line the cooling chamber. In all other cases the walls should be cooled with water or vapor.

Particularly with exothermic subsequent reactions, the stream of the reactant may be divided and one part may be admixed at the apex of the cyclone and the other at the entrance to the succeeding cooling chamber. The temperature in the cyclone chamber can be controlled by a suitable proportioning of the two streams.

Naturally, both cooled chamber walls and the addition of fluids to the gas may be used.

If the reaction is to be carried out by the addition of the reactant to the hot gas stream from the cyclone chamber, within the cooling chamber, momentums of the gas leaving the cyclone chamber and the added reactant can be utilized for thorough mixing. The mixing of the components has been found to be particularly effective when the gas jet leaving the transfer passage enters the cooling chamber at a velocity between 30 and 300 meters/second, preferably between 50 and 120 meters/second. The use of high flow velocities of the magnitude stated and of cooling chambers having dimensions as given above has been found to result in a recirculating flow which is symmetrical to the axis of the cooling chamber. Recirculation and reaction is intensified when the reactant is fed into the recirculating flow.

The transfer passage between the cyclone chamber and the cooling chamber may be cylindrical or frustoconical or a combination of shapes. If a frustoconical passage is used, the frustocone may flare in the direction of flow of the gas or in a direction opposite to the direction of flow thereof.

When the molten material drips from the transfer passage, because of accumulations on the surfaces of the walls of the transfer passage or the like, a water-flooded duct can be disposed directly below the outlet opening of the transfer passage to collect such molten material dripping therefrom and for carrying off the solidified product through this duct.

According to the invention, the solids to be processed, the high-oxygen gas, and, if desired, energy carriers are mixed to form a suspension at a temperature below the reaction temperature, the suspension being fed into a vertical combustion path at a velocity which precludes backfiring. The suspension is reacted in the combustion path to form a suspension which contains mainly molten particles as it is introduced at high velocity into the cyclone chamber. The residence time in the vertical combustion path is selected such that reaction of the suspension is at least 80% completed at the time the suspension enters the cyclone chamber. Various methods may be adopted to supply the suspension to the combustion path at a velocity which precludes backfiring. For instance, the reactants may be admixed in such manner that the suspension has a sufficiently high velocity at its introduction of the vertical combustion path. Alternatively, the components of the suspension may be introduced through nozzles or orifices which prevent backfiring and provide the necessary velocity. It is particularly desirable to provide ahead of the combustion path a charging device with a nozzle-like constriction and which effects the acceleration to a sufficiently high velocity. This tends to eliminate streaking and agglomerates which otherwise tend to form in the suspension. The suspension is completely homogenized so that the particle surfaces is fully available for the reaction. A combustion path of the type described in U.S. Pat. No. 3,915,692 may be used.

The residence time of the suspension in the combustion path is controlled by selection of suitable dimensions. The remaining part of the primary reaction may then be performed in the cyclone chamber. If the subsequent reaction is initiated in the core flow region of the cyclone chamber, it is preferred to dimension the combustion path that the primary reaction has been virtually completed when the suspension enters the cyclone chamber so that a simultaneous performance of primary and subsequent reactions in the cyclone chamber will be avoided. Such simultaneous reactions might result in undesired by-products. The velocity of gas in the combustion path, calculated for the empty tube, is 8 to 30 meters/second according to the invention. The solid particles which have been mixed to form the suspension and are thus fed to the combustion path should have a specific area of 10 to 1000 m$^2$/kg, preferably 40 to 300 m$^2$/kg, corresponding to a median particle diameter of 3 to 300 microns, preferably 10 to 80 microns, the median particle diameter being defined as the diameter of above and below which 50% by weight of the solids are found.

The high-oxygen gases which are used according to the present invention are gases which contain at least 30% by volume oxygen. If such high oxygen gases are not available, they can be prepared by mixing oxygen of high concentration with air and/or other gases. The high-oxygen gases may be formed directly in the mixing stage or previously and the solids in finely divided form may be mixed with the oxygen, with the air, or with any other gases which may be supplied to the combustion tube.

If the reaction between the solids to be treated in the process of the invention and the high-oxygen gases is endothermic or is not sufficiently exothermic that the process proceeds autonomously, any desired energy carrier may be added.

An energy carrier, according to the invention, is any substance which will generate heat when reacted with oxygen. More specifically, the energy carrier is a fuel which can be in a gaseous, liquid or solid state. Or a mixture of fuels in more than one of these states.

When an energy carrier is used, it is desirable, according to the invention, to premix gaseous fuel and high-oxygen gases, to premix solid fuels with the fine grain solids to be treated, and to inject a liquid fuel into the gas stream so as to atomize the liquid therewith. Materials which are noncarbonaceous and generate heat when reacted with oxygen may also be used. Such noncarbonaceous energy carriers include pyrites and sulfur. Naturally, the fuel which is used must be selected so as not to adversely effect the pyrometallurgical reaction which is desired.

According to the invention, at least 85% of the molten material which has been formed in recovered directly from the cyclone chamber while 15% or less of the molten material is entrained with the gas.

The following systems are preferred:

A. Volatilization of volatilizable metals from oxidic ores, ore concentrates or metallurgical intermediate products, followed by a reoxidation in the subsequent reaction owing to an addition of oxygen.

As an example, a transformation of impure zinc oxide to pure zinc oxide may be mentioned. Because the metal-oxidizing reaction is usually exothermic, and particularly the reducing gas phase must be afterburnt simultaneously, the subsequent reaction may be initiated in the core flow region of the cyclone chamber.

B. Roasting of sulfide ores, ore concentrates or metallurgical intermediate products with formation of a molten oxidic material and of sulfur dioxide in the primary reaction, followed by a reduction mainly to elementary sulfur of sulfur dioxide in the subsequent reaction owing to an addition to gaseous reducing agents. Because the subsequent reaction is endothermic, it should be initiate in the cooling chamber.

C. Roasting of sulfide ores, ore concentrate or metallurgical intermediate products with formation of molten oxidic material and sulfur dioxide in the primary reaction and decomposition of waste sulfuric acid as a subsequent reaction. Because the decomposition reaction is highly endothermic, it should be carried out in the cooling chamber. A forced cooling in the cooling chamber is not required in this case.

D. Elimination of the releasable sulfur from pyrite, transformation of iron into iron matte having approximately the composition of FeS, and combustion of the previously eliminated elementary sulfur with stoichiometric quantities of oxygen to form sulfur dioxide. In the subsequent reaction the vaporized zinc is reacted to form zinc oxide, and residual elementary sulfur is reacted to form sulfur dioxide. This process is particularly interesting because the zinc that is contained in the pyrite and volatilized in the primary reaction is no longer available for a formation of zinc ferrite during the roasting of the iron sulfide that has been discharged from the cyclone chamber and has been granulated.

E. Recovery of phosphorus pentoxide by a thermal treatment of raw phosphate or of phosphorus-containing intermediate products together with silicate-containing and carbonaceous substances in the primary reaction and production of condensed phosphates in the subsequent reaction owing to an addition of an alkali hydroxide solution. Because the temperature of the gases leaving the cyclone chamber must be decreased to the temperature required for a formation of condensed phosphates, the subsequent reaction is highly endothermic as a whole and for this reason must be performed in the cooling chamber.

F. Partial combustion of carbon with formation of carbon monoxide and carbon dioxide containing gases in the primary reaction and conversion of the gas to form water gas owing to an addition of liquid or vaporous water. Because the subsequent reaction is highly endothermic, water gas is produced in the cooling chamber.

BRIEF DESCRIPTION OF THE DRAWING

The above and other objects, features and advantages of the present invention will become more readily apparent from the following description, reference being made to the accompanying drawing in which:

In FIG. 1 we have shown a cyclone chamber 2 provided with a combustion path 1 as described in U.S. Pat. No. 3,915,692 and connected by a transfer passage 3 to the front wall of a horizontal cooling chamber 5 which has a horizontal axis. Gaseous or liquid further reactant is supplied through conduits 10 or 7. As shown in cross section in FIG. 2, the cooling chamber can consist of a rectangular parallelepipedal upper portion 3' having a rectangular cross section as shown in 3''. The inlet of the transfer passage 3 is indicated by the innermost broken lines in FIG. 2 and has the diameter D. A water cooled screw conveyor 31 can be provided at the base of the trapezoidal-section portion to carry away the solids.

Figure 1:
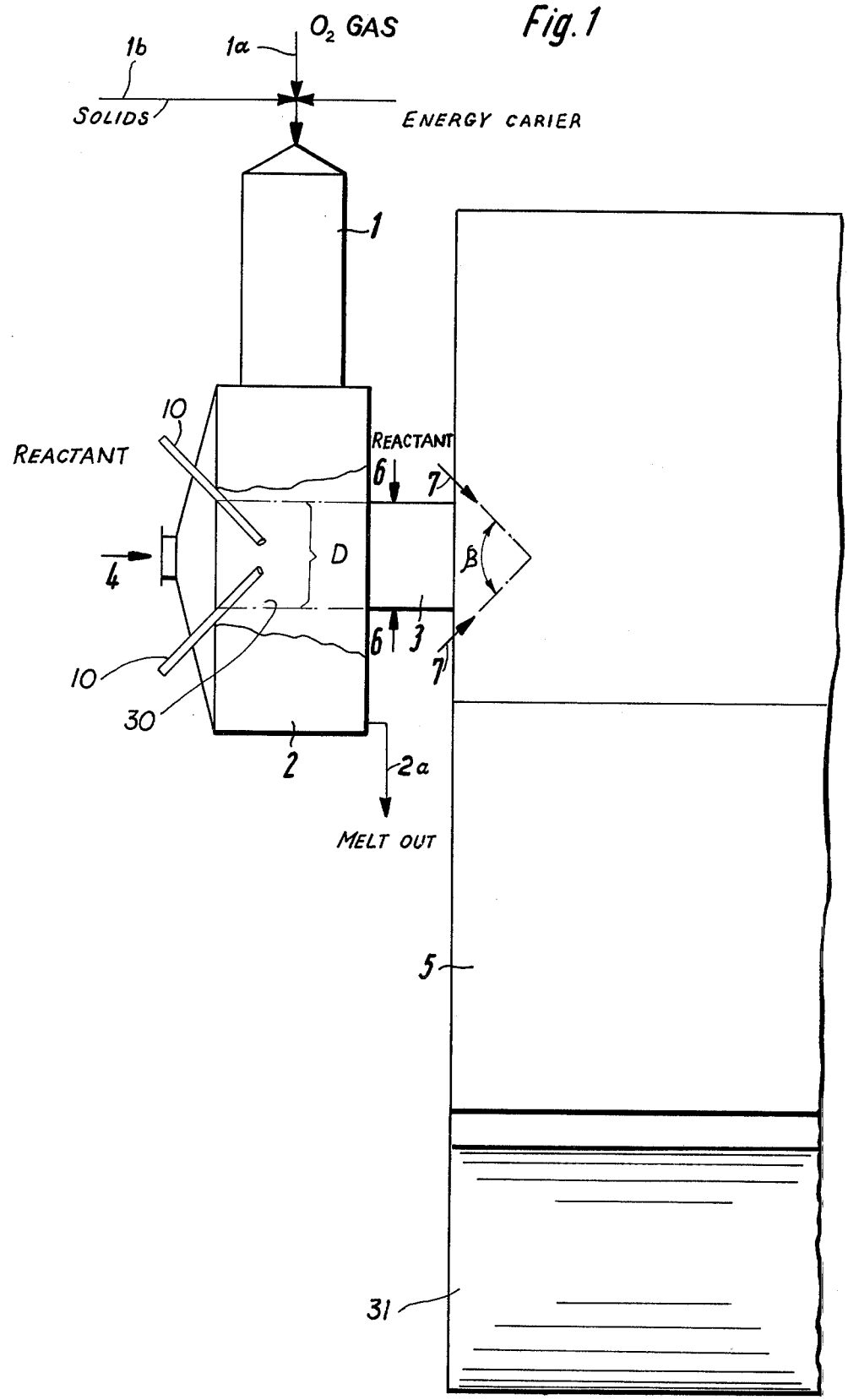
FIG. 1 is a diagram illustrating a cyclone chamber having a horizontal cooling chamber according to the invention.

To the combustion path 1, which can be formed with a constricting nozzle, a suspension can be supplied so that the solids added at 1b, the oxygen-containing gas added at 1a and the energy carrier supplied at 1c can react to at least 80% of completion before the suspension enters the cyclone chamber 2.

The melt is recovered from the lower portion of the shell of the cyclone chamber as shown at 2a.

The reactant can be introduced through the pipes 7 which can have orifices with outlet direction along the surface of the cone. The apex angle B is between 30° and 160° as noted previously.

The wall of the cooling chamber 5 can be provided with a layer of water cooling pipes when a water-cooled wall is desired. The water from the pipes can be transformed into steam for use elsewhere in the metallurgical plant. Reactant was introduced through pipes 6 into the transfer duct 3 when the reaction did not reduce the temperature of the transitting gases below the solidification point of molten products entrained in the gas stream. Pipes 10 could also introduce the reactant into the core-flow region 11 of the reactor.

SPECIFIC EXAMPLES

1. Production of pure zinc oxide from lower purity zinc oxide.

Figure 2:
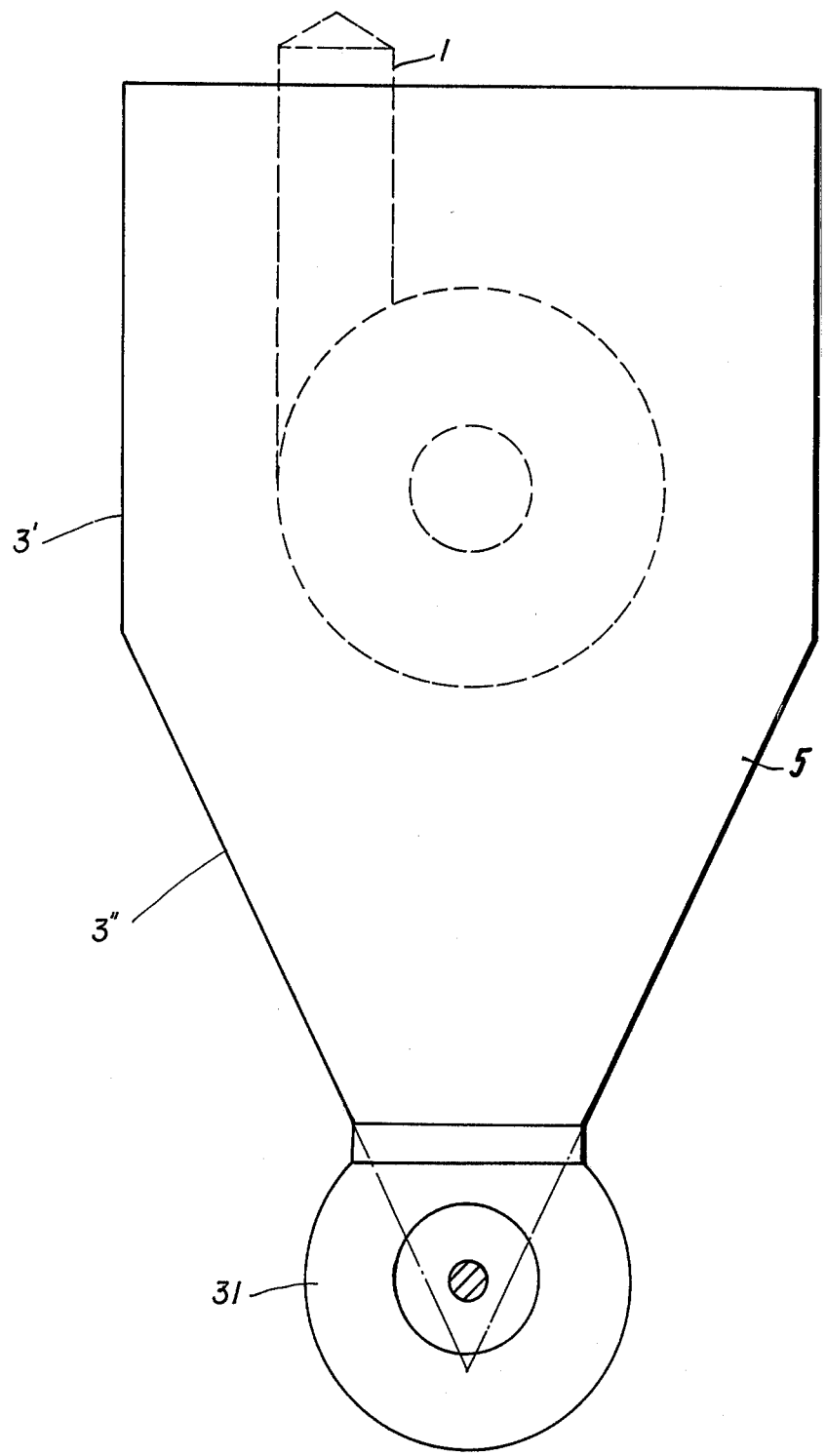
FIG. 2 is a sectional view showing the cooling chamber of FIG. 1 in a vertical section taken transverse to the axis thereof.

A plant was used as illustrated in FIGS. 1 and 2. The combustion path 1 had a diameter of 0.400 meters and a length of 1,3 meters, the cyclone chamber 2 had a diameter of 1.3 meters and a length of 0.93 meters. The rectangular cross section of the cooling chamber had side lengths of 2.1 × 1.3 meters and the trapezoidal cross section had a geight of 1.3 meters and a short side length of 0.48 meters. The axial length of the cooling chamber was 12.5 meters. The diameter of the outlet opening of the cyclone chamber 2 and of the transfer passage 4 was 0.520 meters and the transfer passage 3 had a length of 0.5 meters.

The combustion path 1 was fed with a homogeneous suspension consisting of:

Finely crystalline zinc oxide of 98% purity (contaminated by CaO, MgO, $SiO_2$, and $Al_2O_3$; mediam particle diameter 70 microne), at a rate of 1000 kg/h;

Coke oven gas at 20° C, consisting of 63% by volume $H_2$, 23% bu volume $CH_4$, 5% by volume CO, 2% by volume $CO_2$, balance $N_2$, at a rate of 2600 standard m³/h; and Oxygen-containing gas at 20° C, consisting of 40% by volume oxygen, balance nitrogen, at a rate of 2720 standard m³/h.

A substoichiometric combustion was effected in the combustion path 1. The temperature in the cyclone chamber reached 1500° C.

The zinc was virtually quantitatively reduced and was discharged as elementary zinc in a gas stream, which had a flow rate of 4790 standard m³/h and the following composition in % by volume:
- 5.6: Zn
- 3.5: CO
- 9.4: $CO_2$
- 14.1: $H_2$
- 33.3: $H_2O$ To reoxidize the elementary zinc and oxidize the reducing gaseous constituents, air at 20° C was blown at a rate of 3100 standard m³/h through conduit 6 into transfer passage 3. Zinc oxide having a purity of virtually 100% was produced at a rate of 970 kg/h and was separated as dust.

At a rate of 7060 standard m³/h, exhaust gas having the following composition in % by volume:
- 32.1: $H_2O$
- 8.7: $CO_2$
- 1.3: $O_2$
- Balance: $N_2$ was discharged from the cooling chamber 5.

2. Production of Water Gas

The combustion path 1 of a plant having the dimensions stated in Example 1 was fed with:

Coal containing 80.5% by weight C and 4.5% by weight $H_2$ and having a median particle diameter of 80 microns, at a rate of 3190 kg/h;

Oxygen-containing gas at 20° C, consisting of 50% by volume $O_2$, balance $N_2$, at a rate of 4470 standard m³/h; and Water vapor at 25 bars, heated to 280° C, at a rate of 550 kg/h. Additional water vapor at 25 bars and 280° C was directly fed to the cyclone chamber having the same dimensions as stated in Example 1, at the apex of the cyclone via pipes 10 at a rate of 550 kg/h.

In the combustion path 1 and the cyclone chamber 2, the carbon was partly burned to form a gas having the following composition in % by volume:
- 45.1: CO
- 3.9: $CO_2$
- 2.3: $H_2$
- 5.0: $H_2O$
- Balance: $N_2$ This gas became available at a temperature of 1500° C and at a rate of 9630 standard m³/h. Slag at a rate of 390 kg/h was withdrawn through the opening 2a in the shell of the cyclone chamber.

Water vapor also at 25 bars and 280° C was blown at a rate of 2300 kg/h through conduits 7 into the gas as it entered the cooling chamber 5. The water gas reaction resulted in the formation of a gas having the following composition in % by volume:
- 27.5: CO
- 10.1: $CO_2$
- 25.3: $H_2$
- 19.5: $H_2O$
- Balance: $N_2$ at a rate of 12,490 standard m³/h. As a result of the water gas formation and the radiation of additional heat from the cooling chamber, the combined gas streams were cooled to 800° C. The water in the gas was then condensed out. A gas became available which had the following composition in % by volume:
- 34.16: CO
- 31.4: $H_2$
- 12.5: $CO_2$
- Balance: $N_2$ Because steam was added in the combustion path 1, the cyclone chamber 2, and the cooling chamber 5, the temperature in the cyclone chamber 2 could be maintained at 1500° C in spite of the use of gases having a very high oxygen content.

3. Production of Sodium tripolyphosphate

The Example was carried out in the plant described in Example 1:

Apatite at a rate of 4700 kg/h;
Silica at a rate of 2340 kg/h; and
Coke containing 83% by weight C and 5% by weight $H_2$, at a rate of 900 kg/h were premixed (median particle diameter 70 microns), and fed together with fuel oil having a lower calorific value of 9600 kcal/kg at a rate of 410 kg/h and oxygen-containing gas containing 50% by volume $O_2$, balance $N_2$, at a rate of 6720 standard $m^3/h$ as a homogenous suspension to the combustion path 1.

A temperature of about 1800° C was obtained near the axis of the cyclone chamber 2. Slag at a rate of 5300 kg/h was discharged through an opening 2a in the shell of the cyclone chamber 2.

Gaseous products were formed at a rate of 5200 standard $m^3/h$ and fed to the cooling chamber 5. Caustic soda at a rate of 1490 kg/h (calculated as NaOH), dissolved in water at a rate of 5200 kg/h, was proportionately added through conduits 7 to the gases as they entered the cooling chamber. Due to the influences of the heat of reaction and heat of evaporation, a final temperature of 350° C was obtained. Sodiumtripolyphosphate became available at a rate of 2730 kg/h.

4. Roasting of Ore

Pyrite concentrate containing 40% by weight iron, 46% by weight sulfur, 1% by weight zinc, 0.6% by weight lead, and havomg a median particle diameter of 25 microns was mixed at a rate of 6120 kg/hr with an oxygen-containing gas containing 40% by volume oxygen, balance nitrogen, which was supplied at a rate of 7480 $m^3$/hr (STP). The homogenous suspension was fed to and reacted in the combustion path 1. The products of the reaction were substantially FeO and sulfur dioxide. The resulting calcine was recovered in a molten state from the cyclone at a rate of 3650 kg/hr and granulated in water. The reaction temperature near the axis of the cyclone chamber was about 1620° C.

Exhaust gas from the cyclone chamber 2 at a rate of 7380 $m^3$/hr (STP) was delivered to the cooling chamber 5. The exhaust gas contained 27 volume percent sulfur dioxide, 6.2 volume percent water vapor, 6.7 volume percent oxygen, balance nitrogen, and was at a temperature of approximately 1620° C.

In the cooling chamber 5 the gas was mixed with reacted therein with water gas, which had the following composition in % by volume:

12 $CO_2$
51 CO
35 $H_2$
Balance $N_2$ and which was fed at a rate of 4800 standard $m^3/h$ through conduits 7. By the reaction, the $SO_2$ was reduced to form mainly elemental sulfur and the gas was cooled to 800° C. A gas having the following composition in % by volume:

15.7: S
0.8: $SO_2$
4.1: $CH_4$ + COS + $H_2S$
2.4: CO
1.6: $H_2$
22.2: $CO_2$
15.8: $H_2O$
Balance: $N_2$.

left the cooling chamber at a rate of 11,730 standard $m^3/h$.

We claim:

1. A process for thermally treating particulate solids with a high-oxygen gas comprising the steps of:
   (a) mixing said particulate solids with said gas to form a first suspension;
   (b) introducing said first suspension to a vertical elongated combustion path at a velocity sufficient to prevent backfiring and reacting said first suspension to form a second suspension, in which the suspended phase consists predominantly of molten particulates;
   (c) introducing said second suspension into a cyclone chamber and further separating the components of said second suspension in said cyclone chamber to form a melt and an exhaust gas, said cyclone chamber having an axial outlet in an end wall thereof whereby a core-flow region of gas is formed in said cyclone chamber;
   (d) withdrawing said melt from said cyclone chamber through an opening in the lower portion of the shell;
   (e) passing said exhaust gas from said outlet over a gas-transfer region immediately into a succeeding cooling chamber, said core-flow region, said gas-transfer region and said feed region defining a gas flow path;
   (f) introducing a reactant into said core-flow region or into said exhaust gas immediately downstream thereof.

2. The process defined in claim 1 wherein said reactant is introduced in said transfer region.

3. The process defined in claim 1 wherein said reactant is introduced in said cooling chamber.

4. The process defined in claim 1 wherein said subsequent reaction is at least slightly endothermic said reactant is fed into said cyclone chamber in an axial direction, said subsequent reaction being initiated in said core-flow region of said cyclone chamber and being terminated at the latest within said cooling chamber.

5. The process defined in claim 1 wherein said subsequent reaction is exothermic, said reactant being fed into said transfer region and being initiated in said transfer region, said transfer region spacing said outlet from said cooling chamber.

6. The process defined in claim 1 wherein said reactant is introduced into said cooling chamber, said cooling chamber having a cross-sectional area of at least 5.5 times that of said outlet.

7. The process defined in claim 6 wherein said cross-sectional area of said cooling chamber is 10 to 30 times that of said outlet.

8. The process defined in claim 6 wherein said cooling chamber has a length L such that $3\sqrt{F} < L < 10\sqrt{F}$ where F is the cross-sectional area of the cooling chamber.

9. The process defined in claim 1 wherein the gas feed to said cooling chamber is introduced at a velocity of at least 30 to 300 meters per second.

10. The process defined in claim 1 wherein said reactant is introduced with a large momentum into the entering stream of the gas.

11. The process defined in claim 1 wherein said reactant is introduced into a recirculating flow of gas in said cooling chamber being formed around the entering streams of gas.

12. The process defined in claim 11 wherein said reactant is introduced through a plurality of openings having outlet directions disposed along the conical surface of an emaginary cone having an apex angle of 30° to 160°.

13. The process defined in claim 1 wherein the residence time in said combustion path is controlled such that the reaction of said first suspension is at least 80% complete before said suspension is introduced into said cyclone chamber.

14. The process defined in claim 1 wherein a previously vaporized metal selected from the group which consists of Zn, Pb, Ag, Sb, and Cd is transformed to a corresponding oxide in the subsequent reaction as a result of an addition of oxygen-containing gases as said reactant.

15. The process defined in claim 1 wherein sulfur dioxide, which has previously been formed by roasting of sulfide ores, ore concentrate or metallurgical product, is reduced to elemental sulfur in the subsequent reaction as a result of an addition of a reducing agent as said reactant.

16. The process defined in claim 1 wherein phosphorus pentoxide previously formed by a thermal treatment of raw phosphates or of phosphate-containing intermediate products in a mixture with silicate-containing and carbonaceous substances is reacted to form condensed phosphates in the subsequent reaction as a result of an addition of alkali hydroxide solution as said reactant.

17. The process defined in claim 1 wherein a gas which has previously been formed by a partial combustion of C-containing materials is transformed to water gas in the subsequent reaction as a result of an addition of water as said reactant.

* * * * *